United States Patent [19]

Vicard

[11] 4,151,091
[45] Apr. 24, 1979

[54] APPARATUS FOR SEPARATING SOLID POLLUTANTS FROM FLUIDS

[75] Inventor: Jean-François Vicard, Lyon, France

[73] Assignee: Societe Lab, Rhone, France

[21] Appl. No.: 757,534

[22] Filed: Jan. 7, 1977

Related U.S. Application Data

[62] Division of Ser. No. 581,519, May 28, 1975, Pat. No. 4,017,390.

[30] Foreign Application Priority Data

Jun. 7, 1974 [FR] France .................................. 74 20622

[51] Int. Cl.² .................................................. C02B 1/82
[52] U.S. Cl. .................................. 210/243; 204/180 R; 55/127; 55/DIG. 38
[58] Field of Search .............. 210/512 R, 512 M, 243, 210/311, 304, 42 R, 73 R, 77, 78; 204/180 R, 186, 302; 55/124, 127, 337–339, DIG. 38, DIG. 25, 204

[56] References Cited

U.S. PATENT DOCUMENTS

| | | | |
|---|---|---|---|
| 2,081,772 | 5/1937 | Saint-Jacques | 55/127 |
| 2,816,490 | 12/1957 | Boadway et al. | 210/512 R |
| 3,273,317 | 9/1966 | Vicard | 55/127 |
| 3,545,621 | 12/1970 | Lamort | 210/304 |
| 3,696,934 | 10/1972 | Oisi | 210/512 R |
| 3,839,185 | 10/1974 | Vicard | 210/243 |

Primary Examiner—Charles N. Hart
Assistant Examiner—Benoit Castel
Attorney, Agent, or Firm—Dowell and Dowell

[57] ABSTRACT

Treatment of fluid polluted with solid particles, for instance, from a dust removal or washing process, by pretreating the fluid to agglomerate the particles, then whirling the fluid to centrifugally concentrate the particles in a first fraction of the fluid and thereby substantially purifying a second fraction thereof, filtering the first fraction to recover the solid particles, collecting the particles and recirculating the purified fluid in the particle removal or washing process, the above treatment being carried out by apparatus having particular utility where the fluid is a liquid.

2 Claims, 3 Drawing Figures

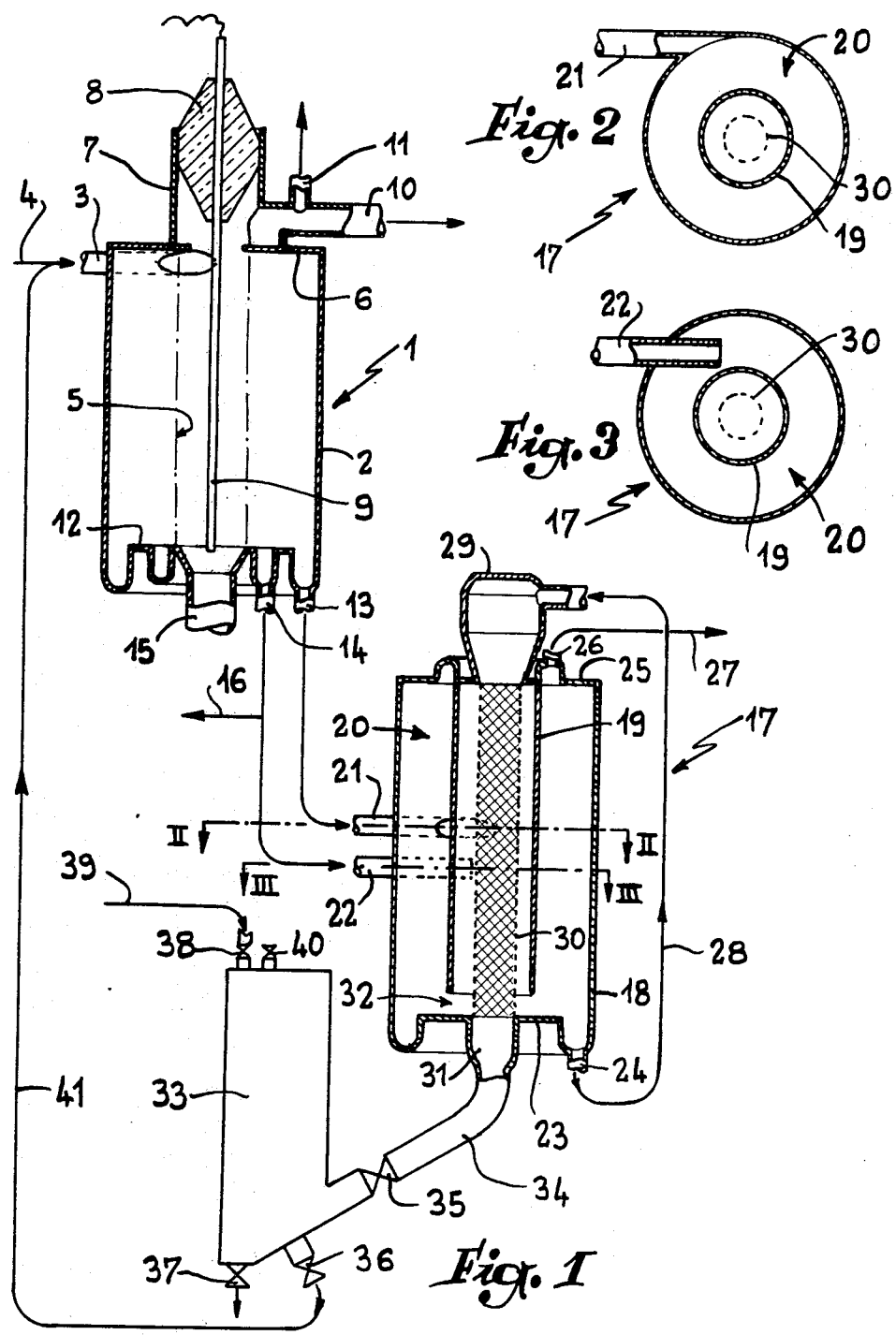

APPARATUS FOR SEPARATING SOLID POLLUTANTS FROM FLUIDS

This is a division of application Ser. No. 581,519, filed May b 28, 1975, now U.S. Pat. No. 4,017,390.

The present invention relates generally to an apparatus for the treatment of gaseous or liquid fluids polluted by solid particles in suspension. More particularly, but not exclusively, it relates to the case of water coming from washing or dust removal and like installations and which contain particles separated from combustion gases or the like in installations of this type.

It is known that the direct discharge of water coming from industrial washing or dust removal operations etc. into the drains or rivers causes considerable danger of pollution. Thus, attempts have been made to find ways of treating this water for the purpose of eliminating the particles which they contain to a sufficient extent in order to obviate or at least considerably reduce the aforesaid dangers of pollution. To this end, it has been proposed to use filters, decanters and centrifuges. Nevertheless, hitherto these apparatus have not made it possible to solve the problem in a satisfactory manner. It is difficult to produce filters ensuring both good filtration and a sufficient flow of filtered water. Decanters are extremely bulky and virtually ineffective as regards fine and light particles. As regards centrifuges, they are expensive and their output is generally too low.

It is the object of the invention to solve the above problem in order to obtain by simple and inexpensive means, firstly water which is sufficiently clear so that it may be re-cycled in the washing, dust removal or like apparatus from which it comes, secondly a sludge which is concentrated enough to be made into pellets and conveyed without difficulty (or even possibly re-cycled in manufacturing processes when the particles constituting the latter have sufficient value. )

It is also the object of the invention to make it possible to extract from the treated waters, a small fraction which is clean enough to be discharged in the drains thus ensuring the progressive renewal of the mass of circulating water in the washing, dust removing and like apparatus and in the treatment installation according to the invention.

According to the invention, the water is firstly made to whirl at high speed in a preparatory apparatus in order that it circulates in the latter in the form of a revolving mass, for example a cylindrical mass, comprising an axial vacuum and located in this vacuum is an electrode having an appropriate potential for causing the agglomeration of the particles, whereas the centrifugal field is used simultaneously for removing the gases and foam as well as the floating particles from the water and for initiating purification by centrifugation, the fraction of partly purified water being able to be returned for use, then the water pre-treated in this manner is supplied to a concentrator inside which it continues to rotate, thus ensuring increased centrifugal concentration. The clear water leaving the central part of the concentrator is extracted and the muddy water is supplied to a filter forming a thickener, the filtered water being returned to the concentrator, whereas the thickened sludge is sent to a lock chamber which is evacuated periodically by pneumatic effect.

When the sludge leaving the lock chamber proves insufficiently concentrated, it may be returned to the inlet of the preparatory device, i.e. it may be re-cycled in the purification installation in order that its concentration is further increased.

The thickening filter may advantageously be disposed along the axis of the concentrator in order to simplify the installation and reduce the bulk thereof.

The accompanying drawings, given as an example, will make it easier to understand the invention, the features which it comprises and the advantages which it is able to provide.

FIG. 1 is a diagram with sections showing an installation for carrying out the invention.

FIGS. 2 and 3 are partial views on lines II—II and III—III (FIG. 1), in which solely the parts located in the plane of the section have been illustrated so as not to overburden the drawing.

The water to be treated comes from a washing, dust removal or like installation and it contains polluting particles which are to be removed. Furthermore, in certain cases, these particles have a commercial value and their recovery may be an advantage. This water is firstly sent to a first apparatus or preparatory apparatus which has been given the general reference 1. The preparatory apparatus 1 is constituted by a cylindrical body 2 comprising a tangential inlet 3 in its upper part, which receives the water to be treated, as shown by the arrow 4. The supply pressure of this water is sufficient for it to whirl rapidly inside the body 2 thus constituting a vortex with an empty axial space. The reference numeral 5 designates the free surface of the mass of water rotating inside the body 2. The upper end 6 of this body 2 comprises an axial casing 7 closed by an insulator 8 through which an axial electrode 9 passes. Naturally, the base 6 is perforated for the passage of the electrode 9, the diameter of the perforation nevertheless being less than that of the upper end of the axial vacuum defined by the surface 5 under normal operating conditions. The aforesaid casing 7 is connected to an overflow pipe 10 to which is connected another pipe 11 leading to the outside.

The lower end 12 of the body 1 comprises two outlets 13 and 14 respectively located very close to the wall of the body 2 and on the contrary in the vicinity of the free surface 5. A central discharge pipe 15 is also provided.

The operation of the preparatory device is as follows: As above-mentioned, the water which arrives through the inlet 3, constitutes a hollow vortex inside the body 2. This vortex is subject to the electrostatic action of the electrode 9 connected to an appropriate high voltage source and provided to have an overall polarising and not ionising effect. Under the action of the field created by this electrode and of the Brounian movement, the particles in suspension in the water tend to agglomerate, whereas the centrifugal force concentrates them towards the wall 2. On the contrary, light foam appears on the free surface 5, where it bursts. The gas liberated in this way as well as the gas released from the liquid escape through the pipe 11, whereas the pipe 10 constitutes a safety measure for ensuring the discharge of the liquid in the case of an overflow. The pipe 13 supplies water having a high concentration of particles, whereas on the contrary, water leaves the pipe 14, which water is already partly purified and which may possibly be taken completely or partly, as shown by the arrow 16, to be re-cycled to the washing, dust removal or like installation from which the water introduced at 3 arrives.

The water leaving the pipe 13 and possibly all or part of the water coming from the pipe 14 is sent to a second apparatus or concentrator 17. The latter comprises an external cylindrical body 18 and an internal cylindrical body 19 coaxial with the former, these two bodies defining an annular space 20 therebetween. Opening into this space 20 and at the mid point of the body 18 are two inlets 21 and 22 respectively connected to the pipes 13 and 14. The first inlet 21 (FIG. 2) opens tangentially into the inside of the body 18 whereas on the contrary, the second inlet 22 is engaged in the latter in order to open out tangentially outside the inner body 19.

Provided in the base 23 of the body 18 is an outlet pipe 24 located close to the wall of the body in order to evacuate the liquid having the highest concentration of solid particles. In turn, the upper end 25 supports an outlet tube 26 but which, on the contrary, is disposed quite close to the inner wall 19 and outside the latter in order to recover the liquid from which virtually all the particles have been removed. This liquid is discharged in the direction of arrow 27 either for its re-use or to be emptied into the drains.

The liquid containing particles which leaves the lower pipe 24 is returned by a pipe shown diagrammatically at 28 to a vessel 29 supported by the upper end 25 above the two bodies 18 and 19. At its lower end, this vessel is connected to a filtering cylinder 30 disposed inside the body 19 and coaxially with respect to the latter, the lower end of this cylinder being fitted in a central tube 31 of the lower end wall 23. The cylinder 30 may be produced in any appropriate manner, for example by a finely perforated sheet metal, by a filtering sleeve appropriately retained against the action of the internal pressure etc.

It will be noted that a free space 32 is provided between the lower end of the body 19 and the end wall 23, this space being able to be continuous or interrupted, as necessary.

The operation of the concentrator 17 as follows: The liquid coming from the pipe 13 and which contains a considerable quantity of particles, rotates rapidly in the annular space 20 such that it is separated into two layers, namely a first layer virtually devoid of particles and discharging through the pipe 26 and a second layer having a high concentration of particles which is returned to the vessel 29 to descend towards the pipe 31 passing through the filter 30. The latter allows a considerable fraction of clear liquid to pass, which liquid descends inside the body 19 in order to be re-cycled through the openings 32 in the central region of the annular space 20. The filter 30 thus operates as a thickener and it is finally a relatively thick sludge which reaches the lower pipe 31.

If arrangements have been made to return all or part of the partially purified liquid leaving the pipe 14, to the concentrator 17, this liquid arrives through the inlet 22 in the central region of the annular space 20 and almost all of it leaves at 26, the residual particles which it may possibly still contain being separated in order to be discharged through the pipe 24.

The sludge coming from the pipe 31 is sent to a pneumatic lock chamber 33 by a pipe 34. This lock chamber is constituted by a closed body (not shown in section in FIG. 1) provided at the bottom with a valve 35 corresponding to the pipe 34 and two discharge valves 36 and 37, whereas it is provided at its upper part with a valve 38 connected to a compressed air line 39 and to a valve 40 forming a flap valve and which opens when the internal pressure falls below atmospheric pressure. The valve 36 is connected to a pipe shown diagrammatically at 41 and which returns to the tangential inlet 3. The valve 37 opens into a sludge collecting basin not shown.

The operation of the lock chamber 33 is as follows: At the beginning of the operating cycle, since this lock chamber is empty, the valves 36, 37, 38 are closed and the valve 35 is opened. The sludge coming from the concentrator 17 accumulates in the lock chamber and raises the air pressure in the latter, this pressure constituting a convenient indication of the degree of filling. When the filling is deemed to be sufficient, the valve 35 is closed and the valve 37 opened. The lock chamber empties under the action of the compressed air in its interior which expands, the sludge being collected in the collecting basin provided for this purpose. Once the lock chamber is empty (possibly with the return of air through the valve 40), the cycle may recommence.

If it proves that the sludge which accumulates in the lock chamber 35 is too liquid, (which may be detected by the fact that this lock chamber fills too quickly,) instead of discharging this sludge through the valve 37, it is the valve 36 which is opened at the same time as the valve 38 for the inlet of compressed air. The pressure of this air thus forces the sludge which is too liquid into the inlet 3 in order to re-cycle the latter.

As is apparent from the preceding description, the installation illustrated in FIG. 1 allows an effective treatment of the water coming from washing, dust removal and like installations whilst facilitating its re-use without any dangers. Naturally, the sludge entrains a certain quantity of water such that re-cycling is insufficient to ensure the supply of the installations in question. Conversely, it is possible to send part of the water leaving the pipe 26 of the concentrator into the drains.

It should be understood that the preceding description was given solely as an example and that it in no way limits the scope of the invention, from which one would not diverge if the details of the embodiments described were replaced by other equivalent measures. In particular, it will be understood that if the arrangement of the thickening filter along the axis of the concentrator 17 constitutes the preferred solution due to the fact that it reduces the bulk by using the available axial space, it may also be possible to provide a separate filter, interposed between the outlet pipe 24 of the concentrator and the inlet pipe 34 to the pneumatic lock chamber 33. Instead of returning the liquid sludge through the pipe 41 by means of compressed air, an appropriate pump may be used for this purpose. In FIG. 1, the axial space of the hollow vortex could be kept at a pressure greater than or less than atmospheric pressure. On the other hand, the parts 2 and 18 shown as cylindrical in the drawing, could be conical, frustoconical, etc.

Furthermore, and as mentioned at the beginning of the present description, although the invention is particularly intended for the treatment of water containing particles, it may also be used in the case of gaseous fluids

I claim:

1. Apparatus for treating a liquid introduced under high pressure and having solid particles suspended therein by agglomerating the particles and centrifuging the liquid to deliver at separate outlets a first fraction of the liquid having a greater particle concentration and a second fraction of the liquid having a lesser particle concentration, comprising:

a hollow vertically oriented cylindrical body having a peripheral wall and having upper and lower ends substantially closed by end walls and having an axis, the lower end wall of the body having a first annular recess located adjacent to said peripheral wall and having a second annular recess concentric with the first annular recess and spaced therefrom toward said axis;

an elongated electrode disposed within said cylindrical body and extending the full length of the body along the axis, said electrode being supported in insulated relationship with respect to said cylindrical body and having means to apply a high voltage to the electrode to create an electrical field with respect to the body;

an inlet extending into the cylindrical body near its upper end, the inlet being disposed tangentially to the peripheral wall to make the liquid introduced therein under high pressure whirl within the body to form a revolving liquid mass having an empty vortex in its center into which the electrode extends out of contact with the liquid;

a first outlet leading downwardly from said first annular recess and located adjacent to the peripheral wall of the body to deliver said first fraction of liquid of higher concentration;

a second outlet leading downwardly from said second annular recess and spaced from said first outlet toward the axis of the body to deliver said second fraction of liquid of lesser concentration, the second recess being spaced sufficiently from the first recess so that the second recess delivers liquid taken near the vortex of the rotating liquid mass and the first recess delivers liquid taken near the peripheral wall of the body, and the lower end wall of the body having a central discharge opening located beneath the electrode and of diameter less than the diameter of the empty vortex of the revolving liquid mass thereadjacent; and the upper end wall of said body having a central opening of diameter less than the diameter of the empty vortex of the revolving liquid mass thereadjacent, said axial opening being connected to an overflow pipe vented to the outside through which gases liberated from the liquid can escape.

2. In apparatus as set forth in claim 1, the upper end of the body having a central opening and having a hollow casing extending upwardly therefrom, and an insulator fixed in said casing and supporting said electrode which extends through the center of the insulator, the central opening being of lesser diameter than the diameter of the empty vortex of the revolving liquid mass thereadjacent, and the diameter of the electrode being small as compared with the diameter of the central opening.

* * * * *